United States Patent
Obermüller

(10) Patent No.: US 9,630,600 B2
(45) Date of Patent: Apr. 25, 2017

(54) CONTROLLER FOR A MOTOR VEHICLE, MOTOR VEHICLE, AND METHOD FOR CONFIGURING THE CONTROLLER

(71) Applicant: Audi AG, Ingolstadt (DE)

(72) Inventor: Anron Obermüller, Königsdorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/365,420

(22) PCT Filed: Dec. 6, 2012

(86) PCT No.: PCT/EP2012/005038
§ 371 (c)(1),
(2) Date: Jun. 13, 2014

(87) PCT Pub. No.: WO2013/087169
PCT Pub. Date: Jun. 20, 2013

(65) Prior Publication Data
US 2014/0350818 A1 Nov. 27, 2014

(30) Foreign Application Priority Data
Dec. 16, 2011 (DE) .......... 10 2011 121 454

(51) Int. Cl.
*B60T 8/172* (2006.01)
*B60T 8/1755* (2006.01)
(52) U.S. Cl.
CPC .......... *B60T 8/172* (2013.01); *B60T 8/17551* (2013.01); *B60T 8/17552* (2013.01);
(Continued)
(58) Field of Classification Search
CPC .. B60T 8/172; B60T 8/17551; B60T 8/17552; B60T 2270/86; B60T 2230/02; B60T 2260/08; B60T 2260/06
See application file for complete search history.

(56) References Cited

U.S. PATENT DOCUMENTS 5,557,520 A 9/1996 Suissa et al.
5,671,982 A 9/1997 Wanke
(Continued)

FOREIGN PATENT DOCUMENTS

DE 43 25 413 2/1995
DE 195 15 046 6/1996
(Continued)

OTHER PUBLICATIONS

International Search Report issued by the European Patent Office in International Application PCT/EP2012/005038 on Mar. 22, 2013.

*Primary Examiner* — John Q Nguyen
*Assistant Examiner* — Michael Kerrigan
(74) *Attorney, Agent, or Firm* — Henry M. Feiereisen LLC.

(57) ABSTRACT

A central control entity controls all actuators of a chassis control system of a motor vehicle. To select a combination of actuator operations best suited for influencing the handling of the motor vehicle, the effect of a change of settings of motor vehicle actuators on the handling is predicted by an observer device configured to receive at least one sensor signal from a sensor via a signal input and, depending on the sensor signal, to determine at least one estimated value for a slip resistance of the motor vehicle. The controller is configured by operating the controller in a test motor vehicle that has a sensor for a measured variable, for which the observer device determines an estimated value. The estimated values from the controller are then compared with corresponding measured values.

3 Claims, 2 Drawing Sheets

(52) U.S. Cl.
CPC ....... *B60T 2230/02* (2013.01); *B60T 2260/06* (2013.01); *B60T 2260/08* (2013.01); *B60T 2270/86* (2013.01)

(56) References Cited

U.S. PATENT DOCUMENTS

| | | |
|---|---|---|
| 6,502,014 B1 | 12/2002 | Herrmann et al. |
| 6,816,806 B2 | 11/2004 | Kocimski |
| 2007/0027586 A1 | 2/2007 | Deng et al. |
| 2009/0319128 A1 | 12/2009 | Lauer et al. |
| 2010/0131145 A1 | 5/2010 | Ryu et al. |
| 2011/0054736 A1 | 3/2011 | Giers et al. |
| 2015/0147608 A1* | 5/2015 | Lin et al. ................ 429/62 |

FOREIGN PATENT DOCUMENTS

| | | |
|---|---|---|
| DE | 102007020169 | 10/2007 |
| DE | 102007018949 | 10/2008 |
| DE | 102008030667 | 1/2009 |
| EP | 0 826 576 | 3/1998 |
| EP | 1 564 097 | 8/2005 |
| EP | 1 743 819 | 1/2007 |
| EP | 2 093 114 | 8/2009 |
| EP | 2 093 115 | 8/2009 |
| WO | WO 99/67115 | 12/1999 |
| WO | WO 2006/077255 | 7/2006 |

* cited by examiner

CONTROLLER FOR A MOTOR VEHICLE, MOTOR VEHICLE, AND METHOD FOR CONFIGURING THE CONTROLLER

CROSS-REFERENCES TO RELATED APPLICATIONS

This application is the U.S. National Stage of International Application No. PCT/EP2012/005038, filed Dec. 6, 2012, which designated the United States and has been published as International Publication No. WO 2013/087169 and which claims the priority of German Patent Application, Serial No. 10 2011 121 454.6, filed Dec. 16, 2011, pursuant to 35 U.S.C. 119(a)-(d).

BACKGROUND OF THE INVENTION

The invention relates to a controller for a motor vehicle for actively influencing the handling of the motor vehicle. The invention also relates to a motor vehicle with such a controller. Lastly, the invention also provides a method for configuring the controller.

With the controller according to the invention, an estimated value of an operating variable that is not directly measurable in the motor vehicle may be provided. The term "observer device" refers here to a system that provides estimated values for the required additional operating variables that can not be directly measured or observed from known input variables that are formed by sensor signals. An observer of the observer device hereby reproduces the handling of the motor vehicle in a model according to which the state variables change commensurate with the sensor signals. The values of the state variables can then be used as estimated values for operating parameters that cannot be measured. A controller with such observer device is known for example from DE 195 15 046 A1

In general, controllers are employed in a motor vehicle, for example, for superimposed steering, rear wheel steering, torque vectoring (splitting the driving torque among individual wheels of the motor vehicle), driving or braking individual wheels, active stabilizers or damper control. The individual actuators for intervening in the handling are usually independently controlled, i.e. the controllers for the individual actuators decide independently which control action is necessary for the current driving situation. It is hereby assumed that there is a so-called peaceful coexistence, i.e. that there is no intervention overlap caused by simultaneous activation of different actuators, which could lead to an unstable handling. However, this makes it necessary to limit the degree of intervention, i.e. the magnitude of the intervention, in the individual actuators to such an extent that the driving stability is not compromised in any situation. As a result, the potential of the existing chassis control systems falls far behind the possibilities that would be available in individual, specific driving situations if the corresponding actuator were allowed to intervene more strongly. In order to be able to fully exploit the potential of a chassis control system for individual driving situations, a central control facility is therefore provided in the motor vehicle according to the so-called Global Chassis Control approach (GCC), which takes over the control of all existing actuators. A controller with a Global Chassis Control is known for example from DE 10 2007 020 169 A1.

A problem with conventional Global Chassis Control approaches is that a model for the handling of the motor vehicle must be relied upon in order to determine a combination of actuator interventions that is best suited for influencing the handling. A single-track model or two-track model is typically used. However, such a model is usually based on an assumption or on linear relationships, which are only present in relatively moderate driving situations. Such model loses its accuracy describing the real conditions with increasing proximity to a boundary region, such as tight cornering at high speed, thus making it impossible to make a reliable assessment of the vehicle stability or the effect of a control intervention on the handling. The future handling as a result of an intervention can then also not be predicted.

The difficulties that arise when planning an intervention when multiple actuators are available will now be discussed again in more detail with reference to the following examples. In an understeering situation, for example, the active front wheel steering is not suitable for vehicle stabilization. Conversely, in oversteering situations, rear wheel steering is not the best choice. However, the front wheel steering angle has a small effect even in an understeering situation and the rear-wheel steering has also a small effect on the handling in an oversteering situation. However, there is typically no way to estimate the magnitude of the effect while driving. Consequently, when a plurality of actuators for influencing the handling are present, an optimal distribution of the adjusted desired variables, for example, a yaw rate, a slip angle or a lateral acceleration on the respective actuators is also not possible.

DE 10 2008 030 667 A1 discloses a method and an apparatus for estimating parameters of a vehicle movement dynamics control system. Slip angle resistance is, among others, estimated as a parameter. The estimated values are required for solving of a system of differential equations using a numerical integration method. Another unknown variable of the equation system is the tire slip angle of the vehicle.

WO 99/67115 A1 describes a control circuit for controlling the driving stability of a vehicle, wherein a tire slip resistance of one or more tires is monitored to determine whether these parameters deviate from standard parameters. In this control circuit, the tire slip angle velocity is detected as a measured input variable.

DE 43 25 413 A1 describes a method for determining the tire slip angle of a vehicle. The tire slip angle is determined from the ratio of the vehicle's lateral velocity and the vehicle's longitudinal velocity. The vehicle's longitudinal velocity is measured, and the vehicle lateral velocity is calculated from the vehicle's lateral acceleration by an observer device.

EP 1 743 819 A1 describes a method and an arrangement for determining the yaw and roll motion of a vehicle. By using interpolation functions, the yaw rate, the average vehicle speed and the lateral acceleration measured at the front of the vehicle are used as parameters. Correction coefficients used here are determined by a manufacturer in comprehensive test series, wherein the vehicle is also subjected to extreme driving conditions and the resulting values for the yaw rate or yaw acceleration and the resulting values for the lateral acceleration are each compared with measured values from a yaw rate sensor. The optimal coefficients for the interpolation functions are determined by a curve fit to the corresponding data points and thereafter permanently stored.

SUMMARY OF THE INVENTION

It is an object of the present invention to be able to predict more accurately the effect of a change in a setting of an actuator of the motor vehicle on its handling.

The controller according to the invention thus has an observer device, which is configured to determine, in response to a sensor signal of the motor vehicle, at least one estimated value of a tire slip of the motor vehicle, and to provide this at least one determined estimated value at a signal output. The tire slip represents here the proportionality factor of the relationship between the tire slip angle of a wheel with the resultant cornering force. It can generally be assumed that the tire slip of a wheel in a motor vehicle is a fixed value when the motor vehicle is in a moderate driving situation. For this reason, a constant value determined during a test drive is used in the observer model of, for example, according to the aforementioned document DE 10 2007 020 169 A1.

Conversely, the at least one value of the tire slip in the controller according to the invention is variable and is estimated by the observer device. This has the advantage that other influences can be taken into account by estimating the tire slip, in particular a change in the tire characteristics (tread wear, heating, air pressure change), a change in the coefficient of friction of the road surface along a route or the change in the total weight of the motor vehicle, for example, due to loading. Such values need then no longer be measured directly, but are factored in indirectly in the control of the actuators via the estimated value of the tire slip. This is advantageously already in moderate driving situations. Estimating the tire slip is also advantageous in extreme driving situations, when there is no longer a linear relationship between the tire slip angles of the individual wheels and the resulting cornering force. In the controller according to the invention, the nonlinear relationship is automatically locally linearized by adjusting the values of the tire slip, whereby the effect of an intervention via an actuator on the handling of the motor vehicle can be predicted within certain limits even in extreme driving situations.

In addition to estimating the tire slip values, the observer device is also configured to determine an estimated value of a tire slip angle of the motor vehicle in response to the at least one sensor signal of the motor vehicle and to provide the estimated value at the signal output. Because of the high costs associated with providing a sensor for the tire slip angle, such corresponding sensors are usually not provided in series-production vehicles. Therefore, one usually resorts to developing control algorithms for actuators while neglecting the tire slip angle, i.e. a tire slip angle $\beta=0$ is assumed. Another conventional approach is to mathematically integrate the tire slip angle speed. However, this is feasible only for short periods of time and is subject to a strong drift. However, by determining an estimate for the tire slip angle with the observer device, more accurate predictions about a change in handling due to interventions from the actuators can now be obtained by using as a basis the available estimated value of the tire slip angle.

In conjunction with a suitable choice of the observer in the observer device, it has proved to be particularly useful to provide at least one the following estimating devices: a Luenberger observer which allows a linear estimate, or a stochastic observer which takes into account in the estimation also measurement noise and other stochastic effects and thus be compensates for them. Suitable statistical observers are hereby in the context of a linear statistical estimation a Kalman filter and in the context of a non-linear stochastic estimation an extended Kalman Filter (EKF), a Unscented Kalman filter (UKF) and a Divided Difference Kalman filter (DD1, DD2). All of the aforementioned estimating devices have the advantage that the observer device automatically adapts the estimated values to deviations which may be caused by changing environmental effects during a trip of the motor vehicle.

Since, unlike in the prior art, in the inventive controller the tire slip resistance values are now treated by the observer device as variable values, the problem can arise depending on the type of estimating device used, that the calculation of the estimated values results in an excessive number of degrees of freedom, causing the estimate to possibly converge only slowly. The problem can be countered in such a case in a simple way by setting a parameter value for at least one of the following parameters of the observer device to a predetermined constant value: a measurement noise, a process noise. These parameters change to a lesser degree than the estimated values for the tire slip resistance values, so that their variation in the observer device can be neglected.

According to a preferred embodiment of the controller, the observer device may include a one-track model or a two-track model of the motor vehicle, as is known from the prior art. However, in this case the controller according to the invention ensures that at least one model parameter of the single-track model is adjusted in dependence on the sensor signal. In other words, the model itself is changed in that not only state variables change in the model commensurate with the sensor signals, but that the model parameters themselves are adjusted. Conversely, in a conventional use of a model, the model parameters remain unchanged, while only the state variables change. For example, the single-track model is according to the invention adapted by way of an observer approach, which then yields the required variables, i.e. the tire slip resistance and the tire slip angle, respectively.

With the controller according to the invention, at least one estimated value for the tire slip resistance can be provided based on a standard sensor system of a type available in series-production motor vehicles. In particular, it is sufficient to provide in the controller a yaw rate sensor and/or a lateral acceleration sensor.

Desired quantities for the handling of the motor vehicle can be defined based on the estimated value for the tire slip resistance and then used to generate appropriate control signals for individual actuators. This is possible in particular on the basis of a Global Chassis Controller. For this purpose, a controller for such a Global Chassis Control is then advantageously coupled via the signal output of the observer device, wherein the controller is configured to define the majority of the desired variables as a function of the estimated values received via the signal output, in particular a desired yaw rate, a desired tire slip angle and/or a desired lateral acceleration. To adjust the handling of the motor vehicle, the majority of the actuators is then controlled in a known manner commensurate with the desired values.

Suitable actuators for use in the controller according to the invention are: a superimposed steering, a rear wheel steering, a torque vectoring device, at least one active stabilizer, at least one active damper, a roll stabilizer, and a driving or braking intervention controller. These actuators can be reliably controlled based on the estimated values of the observer device so as not to cause critical intervention overlap even in extreme driving situations.

In addition to the controller according to the invention described so far, the invention is also directed to a motor vehicle, in which an embodiment of the controller according to the invention is installed.

As already described, it may be necessary in some embodiments of the controller according to the invention to set one or more of the parameters in the observer device to a constant value in order to allow rapid estimation of the tire slip resistance values of the wheels. The method of the invention is provided for suitably configuring the controller in this situation. Here, the controller is operated in a test motor vehicle which has at least one sensor for a measured variable for which the observer device of the controller determines an estimated value. In the context of the method of the invention, the estimated value does not necessarily have to be the same estimated value that is also supplied at the signal output. It can also be an internal estimated value from which other variables can in turn be derived.

According to the method, a parameter value for the parameter of the observer device to be determined is determined as a function of the measured values of the measuring device by which a difference between, on the one hand, the measured values and, on the other hand, the estimated values of the observer device satisfies a predetermined criterion. In other words, a comparison between the estimated values, on the one hand, and the measured values of the sensor, on the other hand, is performed by way of the test run of the test motor vehicle and the parameter of the observer device is set so as to produce an advantageous estimation behavior based on the criterion. According to the criterion, the difference between the measured value and the estimated value should be below a threshold value, in particular, the difference should be minimized.

Advantageously, a sensor for a tire slip angle which is not available in series-production motor vehicles for cost reasons is provided in the test motor vehicle. The tire slip angle is a parameter that plays an important role in a variety of estimating devices for observer devices. In particular, covariance matrices of measurement noise and process noise, which would otherwise need to be estimated by the observer device during normal operation, can be determined by comparing the estimated tire slip angle with the measured tire slip angle which would otherwise cause the estimation accuracy to deteriorate or the estimation process for the tire slip resistance values to slow down.

BRIEF DESCRIPTION OF THE DRAWING

The invention will now be explained in more detail below with reference to exemplary embodiments, wherein.

DETAILED DESCRIPTION OF PREFERRED EMBODIMENTS

The examples represent preferred embodiments of the invention.

Figure 1:
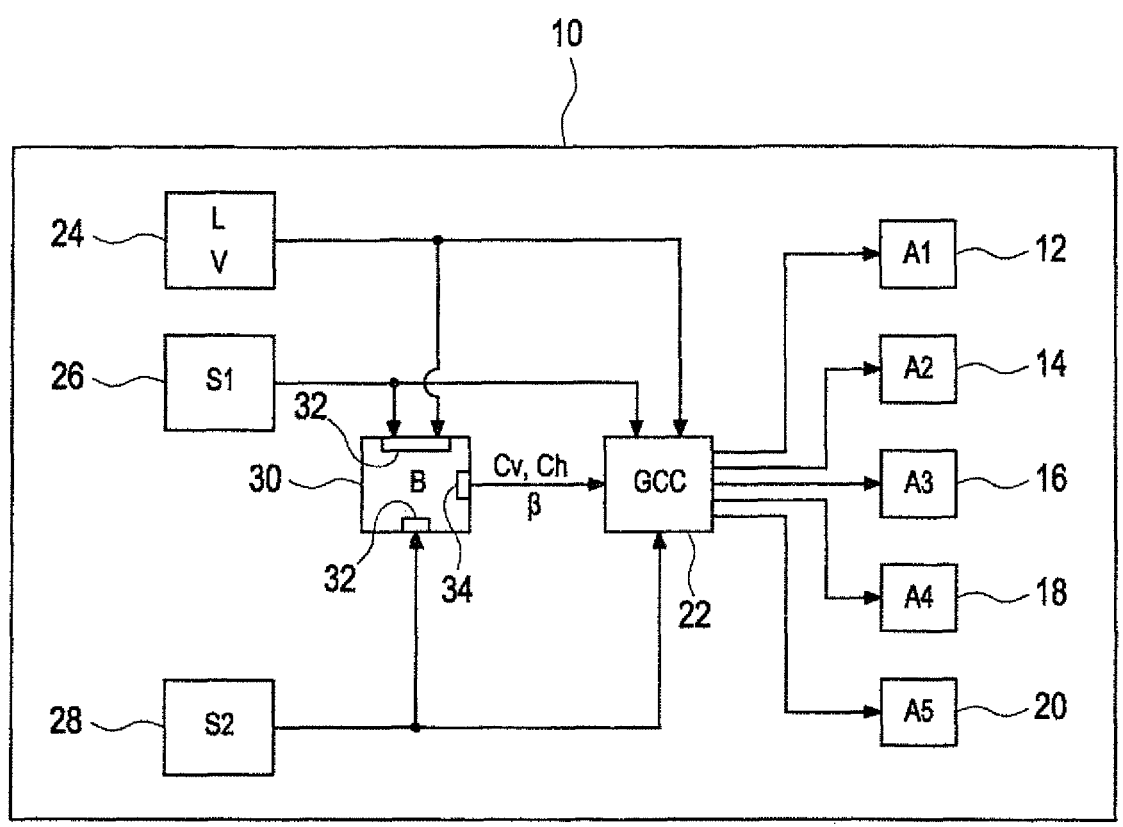
FIG. 1 shows a schematic diagram of a motor vehicle according to an embodiment of the motor vehicle according to the invention.

FIG. 1 shows a motor vehicle 10, in which a plurality of actuators 12, 14, 16, 18, 20 are controlled by a Global Chassis Controller, or in short controller 22. The controller 22 receives from an onboard computer 24 information about a current steering angle L and a current vehicle speed V. In addition, the controller 22 receives sensor signals from sensors 26, 28. The signals from the onboard computer 24 and from the sensors 26, 28 are also transmitted to an observer device 30 which determines additional variables that cannot be measured directly in the motor vehicle 10 and also transmits these additional variables to the controller 22.

The motor vehicle 10 may, for example, be a passenger car or a truck. The actuators 12 to 20 may, for example, be part of one of the following devices for controlling the handling of the motor vehicle 10: a superimposed steering system, a rear-wheel steering, a torque vectoring device, an active stabilizer, an active damper, a roll stabilizer, or a driving or braking intervention control, such as an ESP or an ABS. The sensors 26 and 28 may be, for example, a yaw rate sensor and a lateral acceleration sensor. The described components of the motor vehicle 10 may be coupled with each other for exchange of data for example via a data bus such as a CAN bus. The observer device 30 and the controller 22 may be control programs of a processing unit, such as a microcontroller or an FPGA (Field Programmable Gate Array) or an ASIC (Application-Specific Integrated Circuit) or a general purpose CPU (Central Processing Unit).

The sensors 26, 28 of the motor vehicle 10 are part of a standard vehicle sensor system. Nevertheless, it is now possible for the motor vehicle 10 to predict even in extreme driving situations the consequences of an intervention by the actuators 12 to 20 on the future handling of the motor vehicle 10. This is achieved with the controller 22 by setting setpoint variables—for stabilizing the handling—simultaneously for a plurality of actuators 12 to 20, such as a yaw rate, a tire slip angle and a lateral acceleration, wherein the full potential of each of the actuators 12 to 20 is hereby exploited.

To enable the controller 22 to accurate predict the vehicle behavior as a function of the intervention of the actuators 12 to 20, the observer device 30 receives the sensor signals from the sensors 26, 30 and the signals from the onboard computer 24 via a signal input 32. An estimating device for analyzing the received data is provided in the observer device 30. The estimating device may be, for example, a linear estimating device such as a Luenberger observer, or a linear stochastic estimating device such as a Kalman filter, or even a non-linear stochastic estimating device as an Extended Kalman filter, an unscented Kalman filter or a divided difference Kalman filter. Several estimating devices may also be combined.

The estimating device of the observer device 30 also includes a single-track model, wherein for example a tire slip resistance Cv for the front wheel and a tire slip resistance Ch for the rear wheel of the single-track model are enabled as an adaptation parameter, which means that these model parameters in the estimating device can be adjusted by an observer mechanism for minimizing an estimation error. The aim of the estimating device is to adjust the tire slip resistance values Cv, Ch in the single-track model so that output variables of the single-track model (yaw rate, tire slip angle, lateral acceleration) agree with the actually present values for the yaw rate and lateral acceleration, as indicated by the sensor signals, as well as with actual tire slip angle of the motor vehicle 10. In particular, this agreement holds even when the condition of the tires or the coefficient of friction of the roadway or the load of the motor vehicle change during the trip. The estimated values for the tire slip resistance Cv, Ch and for the estimated tire slip angle β are transmitted to the controller 22 via a signal output 34 of the observer device 30.

The observer device 30 can estimate both the tire slip resistance Cv, Ch and the tire slip angle β, without causing a significant delay in the convergence of the estimate. For this purpose, other parameters of the observer device 30 were set to a fixed value at the time of manufacture or installation in the motor vehicle 10, so that the estimated parameters can be unambiguously determined by the observer device. For this parameterization or calibration of the observer device 30, a similar observer device was operated in a test vehicle, which also included a system for measuring the tire slip angle. A suitable value for the parameter to be set, which led to the agreement of measured and estimated values for the yaw rate, tire slip angle and lateral acceleration, was found by comparing the measured tire slip angle with the tire slip angle $\beta$ estimated by the observer device. This value for the parameter to be set was then set in the observer device 30 of the motor vehicle 10 which is not equipped with the measuring device for the tire slip angle. Thus, the observer device 30 can be used as a real-time-capable estimating device for both the tire slip resistance values Cv, Ch and the tire slip angle $\beta 0$ based on the sensors already installed in series-production vehicle.

Figure 2:
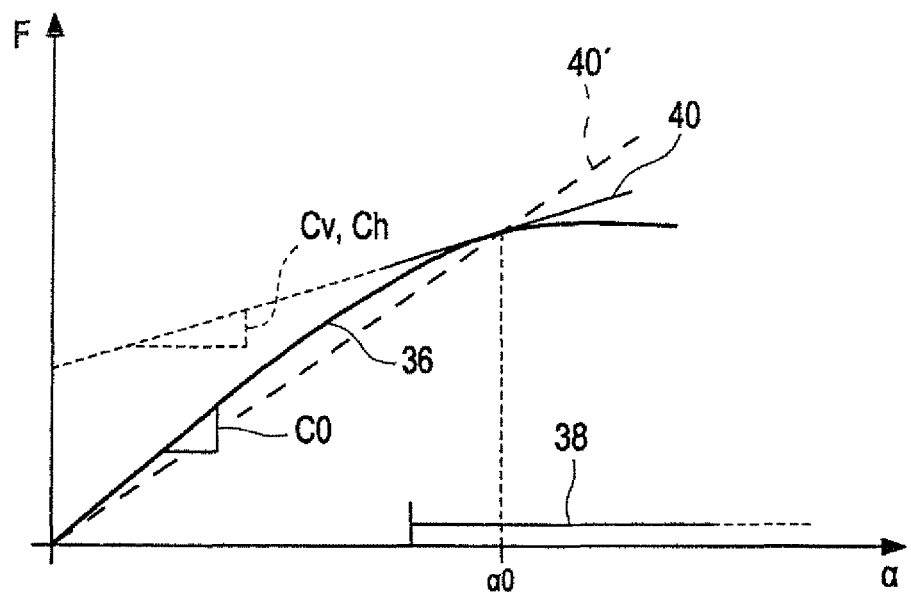
FIG. 2 shows a diagram with a graph illustrating schematically a relationship between a tire slip angle and a resultant cornering force.

FIG. 2 illustrates how, by estimating the tire slip resistance with the observer device 30, the track model contained in the observer device 30 is additionally adapted to the actual and—especially in extreme situations—nonlinear relationship between a tire slip angle $\alpha$ of a wheel and the cornering force F on the wheel resulting from the tire slip angle $\alpha$.

In this context, FIG. 2 shows a graph 36 that schematically illustrates the relationship. For a moderate driving situation in which the motor vehicle 10 has at a given speed a relatively small tire slip angle $\alpha$, the graph 36 is straight, i.e. follows a linear, proportional relationship between the tire slip angle $\alpha$ and the cornering force F. FIG. 2 indicates the constant slope of the graph 36 in this area as a slope triangle for the constant slope C0. When the tire slip angle $\alpha$ is increased at the given speed, the wheel does not continue to build up a cornering force F to the same extent, but instead a region 38 of an extreme driving situation results where the relationship between the tire slip angle $\alpha$ and the cornering force F becomes nonlinear. According to the prior art, controllers designed to satisfy the function of the controller 22 are unable to reliably determine a handling for an extreme driving situation region 38. The reason for this is that the relationship shown in FIG. 2 is usually modeled only based on a linear relationship with the constant slope angle C0. By adjusting the tire slip resistance for the wheel, i.e. Cv or Ch, with the observer device, the graph 36 of the actual effective relationship between the slip angle $\alpha$ and the cornering force F around an actual slip angle $\alpha 0$ can also be approximated by a linearized graph 40 in the region 38 of the extreme driving situation. The straight line of the Cv, Ch estimation can also be a secant 40' instead of a tangent formed by the graph 40. The graph 40' then passes from the origin of the coordinate system to the corresponding point in the nonlinear region of the characteristic tire curve. However, preference is given to determining a tangent.

By using the estimated tire slip resistance values Cv, Ch, the controller 22 is now able to assess the influence of a control variable for the actuators 12 to 20 with respect to the handling of the motor vehicle 10. According to the single-track model, the cornering force Fv for the front axle and the cornering force Fh for the rear axle are calculated as follows:

$Fv = Cv*(\delta v - \beta - Lv*\Psi'/v)$ and $Fh = Ch*(\delta h - \beta + Lh*\Psi'/v)$.

The formula lists, in addition to the aforedescribed variables, the front wheel steering angle $\delta v$ and the rear wheel steering angle $\delta h$, the distance Lv of the front wheel to the center of gravity of the motor vehicle, the distance Lh of the rear wheel to the center of gravity and yaw rate or yaw velocity $\Psi'$ (time derivative of the yaw angle $\Psi$). Since the tire slip resistance values Cv, Ch and the tire slip angle $\beta$ in the motor vehicle 10 are estimated by the observer device 30, the cornering forces Fv, Fh can be determined very accurately. Thus, for example, the effect of the front wheel steering angle $\delta v$ or the rear wheel steering angle $\delta h$ on the handling can be calculated. By an extension of the single-track model, effects due to torque vectoring, driving or braking intervention, damper control, roll stabilization and other interventions of one or more of the actuators 12 to 20 on the handling can then also be evaluated in a known manner. It can thus be calculated whether a control intervention at the current estimated tire slip resistance values Cv, Ch and the resulting current handling would cause an instability of the motor vehicle 10. A control intervention need not actually be performed for this prediction. Such prediction can be made, for example, by determining the dynamic handling that can be inferred from the single-track model in a known manner and by then calculating therefrom the self-steering gradient or eigenvalues of the dynamic system determined based on the single-track model. Conversely, instead of making a prediction, it can also be specifically calculated which controlled variable is necessary to implement the desired behavior. In other words, appropriate control signals for the actuators 12 to 20 for achieving a stable handling can now be selectively determined by the controller 22. This is also possible when a plurality of actuators for influencing the driving performance is provided. The intervention potential of each actuation operation of the actuators 12 to 20 can then be evaluated by way of the estimated tire slip resistance values Cv, Ch, respectively, and the best distribution of the desired setpoints to be set at the actuators 12 to 20 can be determined based, for example, on a mathematical cost function for an optimization algorithm. The existing potential of the chassis control system formed by the actuators 12 to 20 and the controller 22 can thus be fully exploited.

Figure 3:
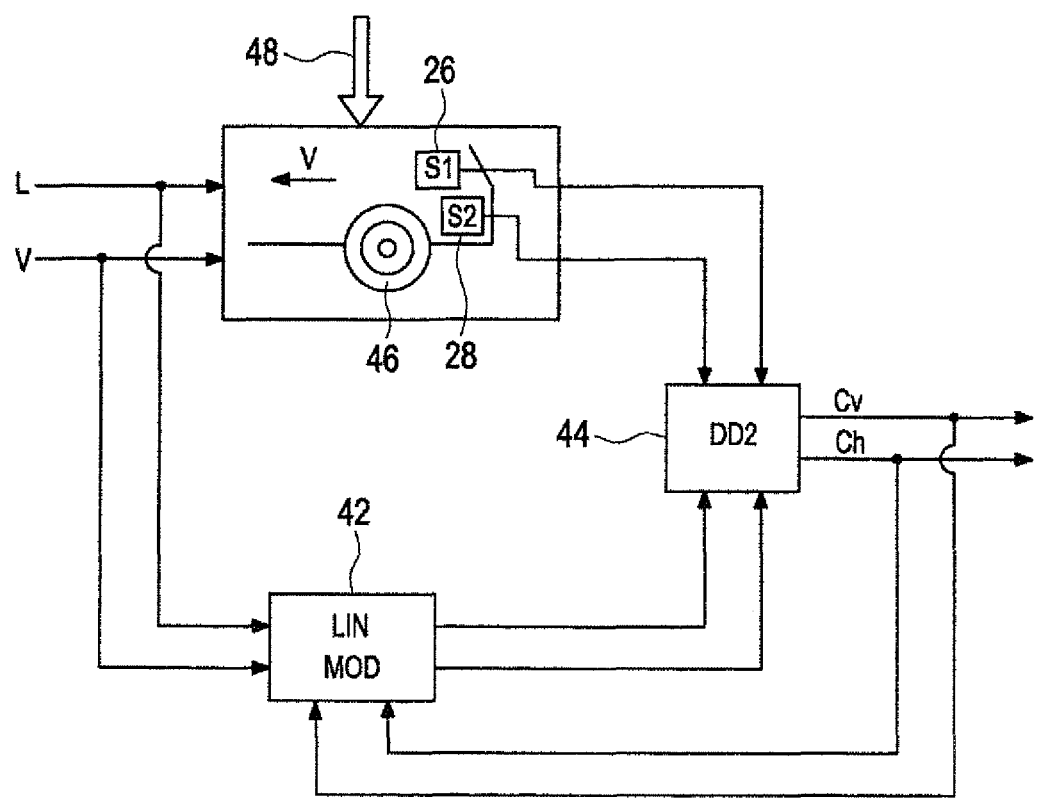
FIG. 3 shows a controller according to an embodiment of the controller according to the invention.

FIG. 3 shows a controller for active rear axle steering, wherein a model-based state estimation is based on a linear model 42. The linear model 42 is adaptive because model parameters, here slip resistance values Cv, Ch, can be controllably adjusted with a Kalman filter 44, which may be, for example, a Divided Difference Kalman filter. The linear model 42 may for example be a single-track model. The yaw rate and lateral acceleration that would need to operate on the motor vehicle are determined with the model 42 depending on a predetermined steering angle L of a rear wheel 46 of a motor vehicle and a predetermined travel speed V of the motor vehicle. The estimated values are transmitted to the Kalman filter 44. The Kalman filter 44 additionally receives from the sensors 26, 28 of the motor vehicle actual measured values of the yaw rate and the lateral acceleration. The sensors 26, 28 of the motor vehicle shown in FIG. 3 may be sensors that are similar to the sensors 26 and 28 shown in FIG. 1. For this reason, they are labeled with the same reference symbols. The measured values of the lateral acceleration and the yaw rate and the corresponding values estimated by the model 42 are compared by the Kalman filter 44. Values that minimize the difference between the estimated values and the measured values for the tire slip Cv, Ch are calculated by the Kalman filter 44. The improved model parameters thus determined by the Kalman filter 44 are then transferred to the linear model 42 where they are used for more predictions.

Environmental factors 48, such as weather, a variable tire profile, a load of the motor vehicle and a condition of the roadway, act on the rear wheel 46 of the motor vehicle while traveling. Rather than detecting all these factors separately, the effects of the environmental factors 48 on the handling of the motor vehicle, and more particularly on the rear wheel 46, are simulated in the Kalman filter 44 of the controller shown in FIG. 3 by way of the changing values of the tire slip resistance values Cv, Ch. Both the tire slip resistance values Cv, Ch estimated by the Kalman filter 44 and the values additionally estimated by the linear model 42, such as a tire slip angle, may be transmitted to (unillustrated) controllers, where they may be used to control (unillustrated) actuators of the motor vehicle. Thus, the individual environmental factors 48 need not be measured by separate sensors in order to be considered in the controller.

The invention claimed is:

1. A controller for a motor vehicle, comprising
an observer device comprising a single-track model of the motor vehicle and a Kalman filter and having a signal input receiving at least one sensor signal from a sensor of the motor vehicle, wherein the at least one sensor signal indicates a yaw rate and a lateral acceleration of the vehicle, said observer device configured to determine, as a function of the at least one received sensor signal, at least one estimated value of a cornering stiffness and an estimated value of a side slip angle of the motor vehicle, said observer device further configured to supply the at least one estimated value of the cornering stiffness and the estimated value of the side slip angle to a signal output of the observer device,
wherein a parameter value of at least one of a measurement noise and a process noise of the observer device is set to a predetermined constant value,
wherein for determining the at least one estimated value of the cornering stiffness and the estimated value of the side slip angle, the observer device is configured to set a value of at least one cornering stiffness parameter of the single-track model as a function of the at least one received sensor signal by controllably adjusting the value of the at least one cornering stiffness parameter by means of the Kalman filter until output variables "yaw rate" and "lateral acceleration" of the single-track model agree with the actually present values for the yaw rate and lateral acceleration as indicated by the at least one received sensor signal and to then transmit an output variable "side slip angle" of the single-track model together with the at least one cornering stiffness parameter to the signal output of the observer device, further comprising a second controller for a "Global Chassis Control" that is coupled to the observer device via the signal output, wherein the second controller is configured to define a plurality of desired variables as a function of at least one of the estimated values received via the signal output and to control at least one actuator selected from the group consisting of a superimposed steering, a rear wheel steering, a torque vectoring device, at least one active stabilizer, at least one active damper, a roll stabilizer, a driving intervention controller and a braking intervention controller.

2. The controller of claim 1, wherein desired variables of the plurality of desired variables are selected from at least one of a desired yaw rate, a desired side slip angle and a desired lateral acceleration.

3. A motor vehicle comprising a controller with an observer device having a single-track model of the motor vehicle and a Kalman filter and a signal input receiving at least one sensor signal from a sensor of the motor vehicle, wherein the at least one sensor signal indicates a yaw rate and a lateral acceleration of the vehicle,
said observer device configured to determine, as a function of the at least one received sensor signal, at least one estimated value of a cornering stiffness and an estimated value of a side slip angle of the motor vehicle, and to supply the at least one determined estimated value of the cornering stiffness and the estimated value of the side slip angle to a signal output,
wherein a parameter value of at least one of a measurement noise and a process noise of the observer device is set to a predetermined constant value,
wherein for determining the at least one estimated value of the cornering stiffness and the estimated value of the side slip angle, the observer device is configured to set a value of at least one cornering stiffness parameter as a function of the at least one received sensor signal, by controllably adjusting the value of the at least one cornering stiffness parameter by means of the Kalman filter until output variables "yaw rate" and "lateral acceleration" of the single-track model agree with the actually present values for the yaw rate and lateral acceleration as indicated by the at least one received sensor signal and to then transmit an output variable "side slip angle" of the single-track model together with the at least one cornering stiffness parameter to the signal output of the observer device; further comprising a second controller for a "Global Chassis Control" that is coupled to the observer device via the signal output, wherein the second controller is configured to define a plurality of desired variables as a function of at least one of the estimated values received via the signal output and to control at least one actuator selected from the group consisting of a superimposed steering, a rear wheel steering, a torque vectoring device, at least one active stabilizer, at least one active damper, a roll stabilizer, a driving intervention controller and a braking intervention controller.

* * * * *

UNITED STATES PATENT AND TRADEMARK OFFICE
CERTIFICATE OF CORRECTION

PATENT NO. : 9,630,600 B2
APPLICATION NO. : 14/365420
DATED : April 25, 2017
INVENTOR(S) : Anton Obermüller Page 1 of 1

It is certified that error appears in the above-identified patent and that said Letters Patent is hereby corrected as shown below:

On the Title Page

Please correct the inventor's first name "Anron" to read --Anton--.

Signed and Sealed this
First Day of August, 2017

Joseph Matal
*Performing the Functions and Duties of the*
*Under Secretary of Commerce for Intellectual Property and*
*Director of the United States Patent and Trademark Office*